United States Patent
Hanshaw et al.

(10) Patent No.: US 10,202,908 B2
(45) Date of Patent: Feb. 12, 2019

(54) OIL PRESSURE CONTROL FOR A VARIABLE CAMSHAFT TIMING SYSTEM

(71) Applicant: Ford Global Technologies, LLC, Dearborn, MI (US)

(72) Inventors: Jamie Charles Hanshaw, South Lyon, MI (US); Paul John Adam, Lasalle (CA); Jeffrey Alan Yeager, Canton, MI (US); Luke Brodbeck, Brighton, MI (US); Joel John Beltramo, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 15/603,206

(22) Filed: May 23, 2017

(65) Prior Publication Data

US 2018/0340476 A1    Nov. 29, 2018

(51) Int. Cl.
| | | |
|---|---|---|
| *F02D 13/02* | (2006.01) | |
| *F01L 1/344* | (2006.01) | |
| *F02D 41/26* | (2006.01) | |
| *F02D 41/00* | (2006.01) | |

(52) U.S. Cl.
CPC ........ *F02D 13/0234* (2013.01); *F01L 1/3442* (2013.01); *F02D 41/009* (2013.01); *F02D 41/26* (2013.01); *F01L 2001/34423* (2013.01); *F01L 2800/05* (2013.01); *F02D 2200/023* (2013.01); *F02D 2200/024* (2013.01); *F02D 2200/101* (2013.01); *F02D 2200/1002* (2013.01)

(58) Field of Classification Search
CPC ............ F01L 2001/34423; F01L 13/04; F01L 2800/05; F02D 13/0234; F02D 2200/023; F02D 2200/024; F02D 2200/1002; F02D 2200/101
USPC ........................................... 123/90.15, 90.17
See application file for complete search history.

(56) References Cited

U.S. PATENT DOCUMENTS

| | | |
|---|---|---|
| 6,871,620 B2 | 3/2005 | Aimone |
| 7,025,032 B2 | 4/2006 | Barber et al. |
| 7,201,147 B2 | 4/2007 | Bernhardt et al. |
| 8,069,829 B2 | 12/2011 | Leone |
| 8,215,272 B2 | 7/2012 | Takemura et al. |
| 8,540,055 B2 | 9/2013 | Ono et al. |
| 8,714,123 B2 | 5/2014 | Rollinger et al. |
| 8,739,746 B2 | 6/2014 | Bidner et al. |
| 2015/0053174 A1* | 2/2015 | Nishimoto .......... F02D 13/0207 123/346 |

* cited by examiner

*Primary Examiner* — Jorge Leon, Jr.
(74) *Attorney, Agent, or Firm* — Julia Voutyras; McCoy Russell LLP

(57) ABSTRACT

Methods and systems are provided for adjusting an oil pressure supplied to an engine and a variable cam timing (VCT) responsive to a condition of the VCT system. In one example, a method may include adjusting the oil pressure based on engine speed, engine load, and engine oil temperature, and responsive to a request to shift the VCT system during specific engine operating conditions, increasing the oil pressure to an upper threshold oil pressure for the duration of the shift.

19 Claims, 5 Drawing Sheets

OIL PRESSURE CONTROL FOR A VARIABLE CAMSHAFT TIMING SYSTEM

FIELD

The present description relates generally to methods and systems for controlling a vehicle engine to adjust the oil pressure supplied to the engine and a variable camshaft timing system responsive to operating conditions of a the variable camshaft timing system.

BACKGROUND/SUMMARY

Internal combustion engines may use variable cam timing (VCT) to increase vehicle fuel economy and emissions performance. Many variable cam timing systems use a vane type cam phaser that may be controlled by an electromechanically actuated spool valve that directs oil flow to one side or the other of the vane in order to actuate the phaser, thereby adjusting camshaft timing with respect to the engine crankshaft timing. Actuation of these variable timing systems, and thus the timing of the engine cylinder valves, is highly dependent on the oil flow and oil pressure in the VCT system. Modern oil control systems may include an oil pump, known as a variable displacement oil pump (VDOP), which may be calibrated to adjust the pump operation responsive to parameters such as engine temperature, engine load, and engine speed. These oil control systems often supply multiple engine subsystems with competing and overlapping demands, including bearings, hydraulic valve mechanisms, VCT systems, and piston cooling jets. Further, in order to minimize parasitic losses and increase fuel economy, variable displacement oil pumps are often calibrated to supply the minimum oil pressure to maintain lubrication engine components, provide sufficient cooling, and actuate engine components.

The inventors herein have recognized that by controlling the oil pressure to the VCT system based on conventional engine operating parameters, VCT phasers may not be supplied with sufficient oil pressure under certain operating conditions, namely operating conditions that necessitate an abrupt or substantial shift of the VCT phaser, to facilitate the desired phaser response. Operating the VCT system with reduced oil pressure may result in reduced phasing velocity of the VCT phasers, resulting in degraded performance of the VCT system. Degraded performance of the VCT system may include delayed engine response, a lag in turbo spool up time, as well as noise, harshness, and vibration (NVH) issues.

Other attempts to address providing the VCT system with sufficient oil pressure include incorporating an auxiliary system to allow the short duration, high flow rate pulses needed to shift the VCT phaser. One example approach is shown by Aimone in U.S. Pat. No. 6,871,620. Therein, Aimone discloses an engine system with an on-demand auxiliary oil pump used in conjunction with an accumulator, in addition to a conventional oil pump, to supply adequate oil pressure to the VCT system at very low engine speeds or when the VCT unit returns to a locked start-up position. Still further attempts to address providing the VCT system with sufficient oil pressure include upsizing a fixed rate oil pump to meet the oil pressure demands of the VCT system. Yet another attempt to provide sufficient oil pressure to the VCT system includes adjusting the oil pressure delivered to the VCT system based on a comparison of a modeled phasing rate and an actual phasing rate of the VCT, and correlating the data to the pressure in the engine oil system.

However, the inventors herein have recognized potential issues with such systems. As one example, adding an auxiliary oil system to supply the VCT system adds cost and complexity to the vehicle. Operating a supplemental pump may put additional load on the engine, thereby decreasing performance, and adding a pump and an accumulator to an already tight engine compartment may not be feasible. Upsizing a fixed rate engine oil pump to meet the periodic high demands of the VCT system is known to increase parasitic losses and degrade fuel economy. As another example, adjusting oil pressure to the VCT system based on computationally intensive models may not accurately represent actual, transient engine operating conditions. Additionally, such a system may not be capable of completing the computation rapidly enough to adjust the VCT as demanded.

In one example, the issues described above may be addressed by a method for adjusting an oil pressure supplied to an engine and a variable cam timing (VCT) system to a first level based on engine speed, engine load, and engine oil temperature; and in response to a condition of the VCT system, increasing the oil pressure to a second level that is higher than the first level for a duration. In this way, a VCT system may be supplied with sufficient oil pressure during operating conditions that include an abrupt or substantial shift of the VCT system.

As one example, the method might include, during a first condition, adjusting the output of an oil pump that supplies oil to an engine and a variable cam timing (VCT) system to a first level that is based on engine speed, engine load, and engine oil temperature. During a second condition, the method may include adjusting the output of the oil pump to a second level that is based on a commanded position of the VCT system and not engine speed, engine load, and engine oil temperature, where the second level is greater than the first level.

In this way, a variable displacement oil pump may be selectively controlled to provide an increased level of oil pressure to the VCT system during certain operating conditions of the VCT system, leading to an efficient oil delivery system that may minimize parasitic losses and increase fuel economy while still meeting the intermittent high demands of the VCT system. As a result of using the existing engine oil pump to supply the VCT system rather than adding a supplementary oil system, system costs may be reduced. By expeditiously supplying the VCT system with the requisite oil pressure for rapid shifting, issues with turbo lag and NVH may decrease, while engine responsiveness and performance may increase.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
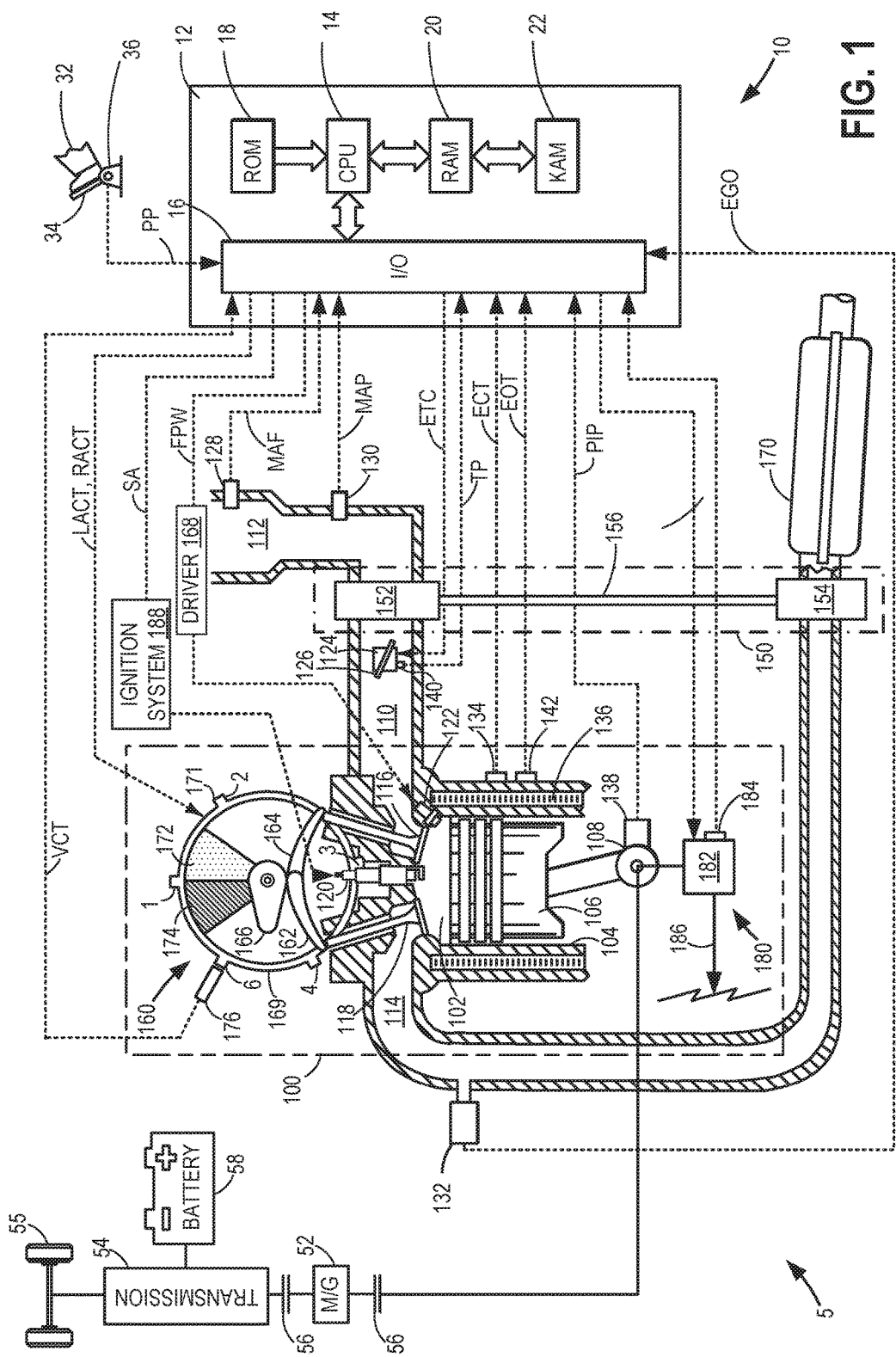
FIG. 1 shows a schematic depiction of an engine including a variable cam timing (VCT system).
Figure 2:
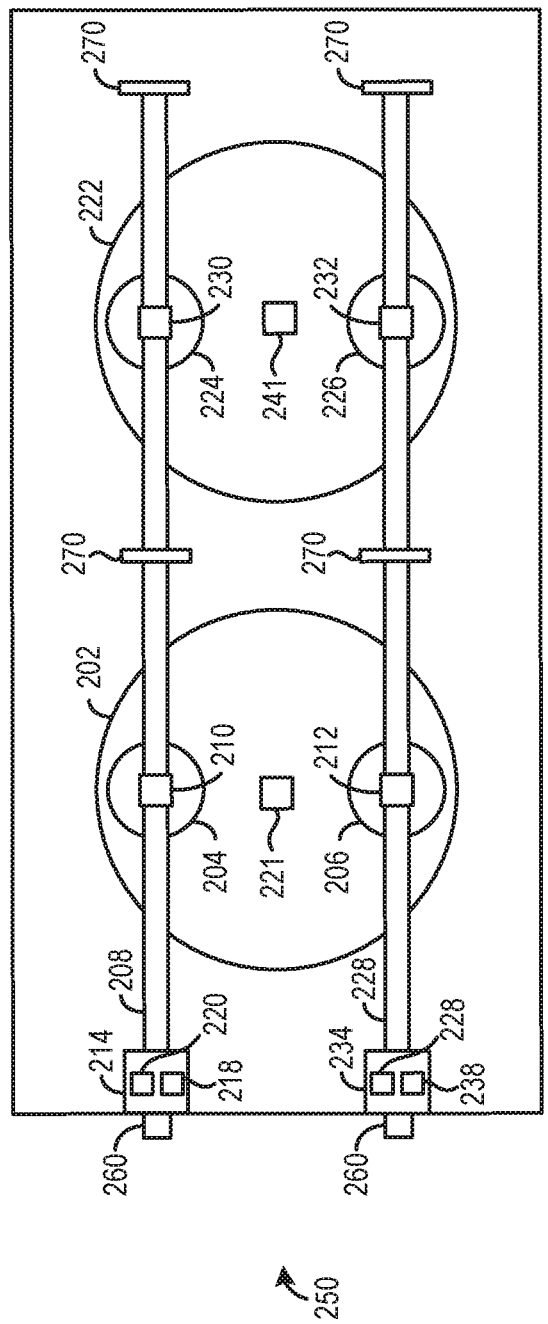
FIG. 2 shows another schematic depiction of a variable cam timing (VCT) system for an engine.
Figure 3:
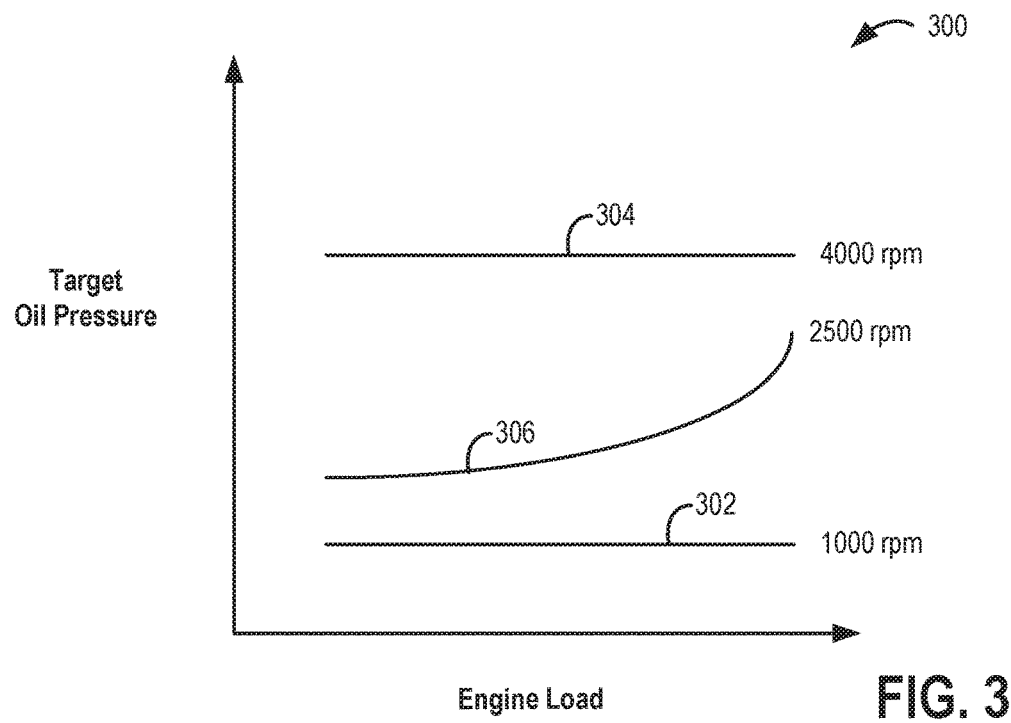
FIG. 3 shows a calibration graph of oil pressure and engine load for varying engine speeds.
Figure 4:
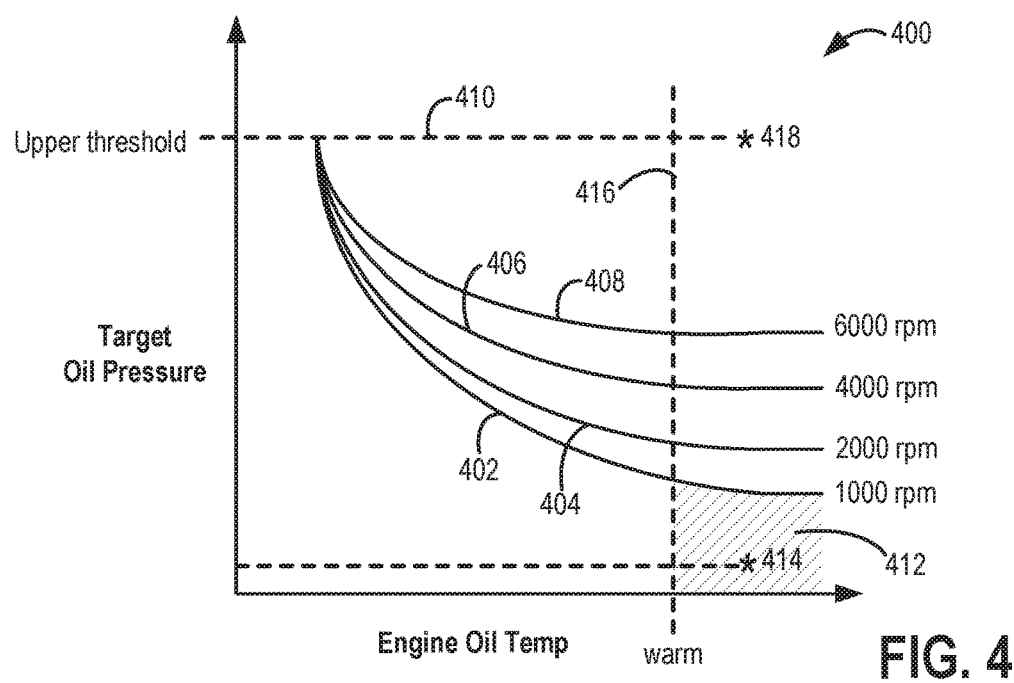
FIG. 4 shows a calibration graph of oil pressure and engine oil temperature for varying engine speeds.

The following description relates to systems and methods for controlling oil pressure for a vehicle engine with variable cam timing, such as the engine shown in FIG. 1, to adjust the oil pressure generated by an oil pump (e.g., variable displacement oil pump) responsive to engine operating conditions and the operating conditions of the variable cam timing system. An engine may include one camshaft per bank of engine cylinders to control both the intake an exhaust valves, as shown in FIG. 1, or an engine may include more than one camshaft per bank of engine cylinders to control the intake and exhaust valves independently, as shown in FIG. 2. Conventionally, oil pressure from a variable displacement oil pump may be calibrated by a controller to adjust oil pressure responsive to operating parameters such as engine load, engine speed, and engine temperature. Two example calibration graphs used to adjust oil pressure based on these engine operating parameters are shown in FIGS. 3 and 4. Additionally, an engine controller may be configured to perform a control routine, such as the example routine of FIG. 5, to adjust the output of an engine oil pump, responsive to engine operating conditions such as engine load, engine speed, and engine temperature, and when select conditions of the VCT system are met, the controller may increase the output of the engine oil pump above the level that is based on engine speed, engine load, and engine oil temperature. As a result, sufficient oil pressure may be supplied to the VCT system during select conditions. An example engine operation with a variable displacement oil pump and a VCT system is shown in FIG. 6. By controlling the output of the variable displacement oil pump responsive to specific operating conditions of the VCT system, sufficient oil pressure may be provided during tip-in from idle conditions while there is a command to adjust the timing of the VCT system as well as when a vehicle controller commands the VCT to return to a home position from a current position that is more than a threshold distance away.

Turning now to FIG. 1, a schematic depiction of an engine 10 including a variable cam timing (VCT system) is shown. Engine 10 is included in vehicle system 5. It will be appreciated that engine 10 may be any engine configuration. In one example engine 10 may be a V-8 engine with two cylinder banks, each having four cylinders. However in alternate examples, engine 10 may have an alternate configuration, such as an alternate number of cylinders (e.g., V-4, V-6, etc.), or an in-line arrangement of cylinders (e.g., I-3, I-4, etc.). As one non-limiting example, engine 10 can be included as part of a propulsion system for a passenger vehicle. Engine 10 may be controlled at least partially by a control system including controller 12 and by input from a vehicle operator 32 via an input device 34. In this example, input device 34 includes an accelerator pedal and a pedal position sensor 36 for generating a proportional, pedal position signal PP.

Engine 10 shows an example cylinder 102 (also known as combustion chamber 102) that is part of an engine block region 100 including a cylinder head and an engine block.

The cylinder head may include one or more valves for selectively communicating with an intake and an exhaust system, for example, while the engine block may include multiple cylinders, a crankshaft, etc. It will be appreciated that block region 100 may include additional and/or alternative components than those illustrated in FIG. 1 without departing from the scope of this disclosure.

Cylinder 102 of engine 10 includes cylinder walls 104 with piston 106 positioned therein. Piston 106 is shown coupled to crankshaft 108 so that reciprocating motion of the piston is translated into rotational motion of the crankshaft. In some examples, vehicle 5 may be a hybrid vehicle with multiple sources of torque available to one or more vehicle wheels 55. In the example shown, vehicle 5 includes engine 10 and an electric machine 52. Electric machine 52 may be a motor or a motor/generator. Crankshaft 108 of engine 10 and electric machine 52 are connected via a transmission 54 to vehicle wheels 55 when one or more clutches 56 are engaged. In the depicted example, a first clutch 56 is provided between crankshaft 108 and electric machine 52, and a second clutch 56 is provided between electric machine 52 and transmission 54. Controller 12 may send a signal to an actuator of each clutch 56 to engage or disengage the clutch, so as to connect or disconnect crankshaft 108 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

In other examples, vehicle 5 is a conventional vehicle with only an engine, or an electric vehicle with only electric machine(s). In conventional vehicle examples, crankshaft 108 may be coupled to at least one drive wheel of a vehicle via an intermediate transmission system without an intermediate electric machine. Further, a conventional starter motor may be coupled to crankshaft 108 via a flywheel (not shown) to enable a starting operation of engine 10.

Cylinder 102 receives intake air from intake manifold 110 via intake passage 112 and exhausts combustion gases via exhaust passage 114. Intake manifold 110 and exhaust passage 114 can selectively communicate with cylinder 102 via respective intake valve 116 and exhaust valve 118. In some embodiments, cylinder 102 may include two or more intake valves and/or two or more exhaust valves. In some examples, engine 10 may be a variable displacement engine (VDE), having one or more cylinders 102 with selectively deactivatable intake valves 116 and selectively deactivatable exhaust valves 118.

In some embodiments, one or more of the intake passages may include a boosting device such as a turbocharger or a supercharger. For example, FIG. 1 shows engine 10 configured with a turbocharger 150 including a compressor 152 arranged between intake manifold 110 and intake passage 112, and an exhaust turbine 154 arranged along exhaust passage 114. Compressor 152 may be at least partially powered by exhaust turbine 154 via a shaft 156 where the boosting device is configured as a turbocharger. However, in other examples, such as where engine 10 is provided with a supercharger, exhaust turbine 154 may be optionally omitted, where compressor 152 may be powered by mechanical input from a motor or the engine 10.

In some embodiments, each cylinder of engine 10 may include a spark plug 120 for initiating combustion. Ignition system 188 can provide an ignition spark to combustion chamber 102 via spark plug 120 in response to spark advance signal SA from controller 12, under select operating modes. However, in some embodiments, spark plug 120 may be omitted, such as where engine 10 may initiate combustion by auto-ignition or by injection of fuel, as may be the case with some diesel engines.

Fuel injector 122 is shown coupled directly to combustion chamber 102 for injecting fuel directly therein in proportion to the pulse width of signal FPW received from controller 12 via electronic driver 168. In this manner, fuel injector 122 provides what is known as direct injection of fuel into cylinder 102. While FIG. 1 shows fuel injector 122 positioned to one side of cylinder 102, it may alternatively be located overhead of the piston, such as near the position of spark plug 120. Such a position may facilitate mixing and combustion when operating the engine with an alcohol-based fuel due to the lower volatility of some alcohol-based fuels. Alternatively, the injector may be located overhead and near the intake valve to increase mixing. Fuel may be delivered to fuel injector 122 by a fuel delivery system (not shown) including a fuel tank, a fuel pump, and a fuel rail. In some embodiments, combustion chamber 102 may alternatively or additionally include a fuel injector arranged in intake manifold 110 in a configuration that provides what is known as port injection of fuel into the intake port upstream of cylinder 102.

Intake manifold 44 is shown with throttle 124 including throttle plate 126 whose position controls airflow. In this particular example, the position of throttle plate 126 may be varied by controller 12 via a signal provided to an electric motor or actuator included with throttle 124, a configuration that may be referred to as electronic throttle control (ETC). In this manner, throttle 124 may be operated to vary the intake air provided to cylinder 102 along with other cylinders within engine 10. It will be appreciated that in alternate embodiments, throttle 124 may be positioned upstream of compressor 152, or there may be a first throttle positioned upstream of compressor 152 and downstream of compressor 152. Intake passage 112 may include a mass air flow (MAF) sensor 128 and a manifold absolute pressure (MAP) sensor 130 for providing respective signals MAF and MAP to controller 12.

Exhaust gas sensor 132 is shown coupled to exhaust passage 114 upstream of catalytic converter 170. Exhaust gas sensor 132 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as exhaust manifold, upstream and/or downstream air-fuel ratio sensors. Catalytic converter 170 can include multiple catalyst bricks, in one example. In another example, multiple emission control devices, each with multiple bricks, can be used. Catalytic converter 170 can be a three-way type catalyst in one example. Engine 10 may further include one or more exhaust gas recirculation passages (not shown) for recirculating a portion of exhaust gas from the engine exhaust to the engine intake. As such, by recirculating some exhaust gas, an engine dilution may be affected which may be advantageous for engine performance by reducing engine knock, peak cylinder combustion temperatures and pressures, throttling losses, and NOx emissions.

Engine 10 includes an oil delivery system 180 for providing oil for component cooling and lubrication, as well as for oil pressure actuated (OPA) systems. The VCT system in the depicted embodiment is one non-limiting example of an OPA system. Oil delivery system 180 may include an oil pump 182 coupled to the engine and the VCT system that receives instructions from controller 12 to adjust oil output pressure and/or flow. In one example, oil pump 182 may be a variable displacement oil pump or a variable flow oil pump, including but not limited to an axial piston pump, a bent axis pump, or a variable displacement vane pump. In other examples, oil pump 182 may be a fixed rate oil pump with a regulator or actuatable valve to selectively control pump output, or another suitable type of oil pump with variable output. In another non-limiting example, oil delivery system 180 may include an active relief valve (not shown). Therein, oil pressure output may be increased or decreased as a result of actuation of the active relief valve. Further, the active relief valve may be controlled via a control solenoid that may be actuated by controller 12.

An oil pressure sensor 184 in oil delivery system 180 may be used to determine the oil pressure generated by the oil pump 182. In some examples, control of the oil pump may be feedback-based, wherein controller 12 receives a signal from oil pressure sensor 184 to adjust the operation of oil pump 182 to reach a desired oil pressure or to maintain a desired oil pressure. Oil pump 182 may be coupled to crankshaft 108 to provide rotary power for operating oil pump 182. In one example, oil pump 182 includes a plurality of internal rotors (not shown) that are eccentrically mounted. At least one of the internal rotors may be controlled by controller 12 to change the position of that rotor relative to one or more other rotors to adjust an output flow rate of oil pump 182 and thereby adjust the oil pressure. For example, the electronically controlled rotor may be coupled to a rack and pinion assembly that is adjusted via the controller 12 to change the position of the rotor. The oil pump 182 may selectively provide oil to various regions and/or components of engine 10 to provide cooling and lubrication, or to actuate movement of components. The output flow rate or oil pressure of the oil pump 182 may be adjusted by the controller 12 to accommodate varying operating conditions to provide varying levels of cooling and/or lubrication. Further, the oil pressure output from the oil pump 182 may be adjusted to reduce oil consumption and/or reduce energy consumption by the oil pump 182.

It will be appreciated that any suitable oil pump configuration may be implemented to vary the oil pressure and/or oil flow rate. In some embodiments, instead of being coupled to the crankshaft 108, oil pump 182 may be coupled to a camshaft, or may be powered by a different power source, such as a motor or the like. Oil pump 182 may include additional components not depicted in FIG. 1, such as a hydraulic regulator, electro-hydraulic solenoid valve, etc. (not shown).

Oil pumped by oil pump 182 may be routed through one or more channels 186 to components based on their oil flow and pressure demands. For example, oil may be pumped by oil pump 182 through a first channel of channels 186 to engine block region 100 to provide oil flow to a first group of components. In one example, the first group of components may include a variable camshaft timing (VCT) system 160. In other non-limiting examples, oil may be pumped by oil pump 182 via a second channel of channels 186 to a second group of components including, for example, turbocharger 150, bearings (not shown), and a piston cooling jet (not shown) in the engine block region 100. The second group of components may be grouped separately from the first group of components based on their higher pressure and lower oil flow demands for component cooling and lubrication. It will be appreciated that any number of engine components that utilize oil may be coupled to oil delivery system 180.

Cylinder head and engine block region 100 houses a variable valve operation system such as the VCT system 160. In this example, an overhead cam system is illustrated, although other approaches may be used. Specifically, camshaft 166 of engine 10 is shown communicating with rocker arms 162 and 164 for actuating intake valve 116 and exhaust valve 118, respectively. VCT system 160 may be oil-pressure actuated (OPA). By adjusting a plurality of hydraulic valves to thereby direct a hydraulic fluid, such as engine oil, into the cavity (such as an advance chamber or a retard chamber) of a camshaft phaser, valve timing may be changed (e.g., advanced or retarded). One non-limiting example of a camshaft phaser is shown in FIG. 2. The operation of the hydraulic control valves may be controlled by respective control solenoids. Specifically, an engine controller may transmit a signal to the solenoids to move a valve spool that regulates the flow of oil through the phaser cavity. As used herein, advance and retard of cam timing refer to relative cam timings, in that a fully advanced position may still provide a retarded intake valve opening with regard to top dead center, as an example.

Camshaft 166 is hydraulically coupled to housing 169. Housing 169 forms a toothed wheel having a plurality of teeth 171. In the example embodiment, housing 169 is mechanically coupled to crankshaft 108 via a timing chain or belt (not shown). Therefore, housing 169 and camshaft 166 rotate at a speed substantially equivalent to each other and synchronous to crankshaft 108. In an alternate embodiment, as in a four stroke engine, for example, housing 169 and crankshaft 108 may be mechanically coupled to camshaft 166 such that housing 169 and crankshaft 108 may synchronously rotate at a speed different than camshaft 166 (e.g. a 2:1 ratio, where the crankshaft rotates at twice the speed of the camshaft). In the alternate embodiment, teeth 171 may be mechanically coupled to camshaft 166.

By manipulation of the hydraulic coupling (e.g., phaser) contained within housing 169 as described herein, the relative position of camshaft 166 to crankshaft 108 can be varied by hydraulic pressures in retard chamber 172 and advance chamber 174. For example, by allowing high pressure hydraulic fluid to enter retard chamber 172, the relative relationship between camshaft 166 and crankshaft 108 may be retarded. As a result, intake valve 116 and exhaust valve 118 may open and close at a time later than normal relative to crankshaft 108. Similarly, by allowing high pressure hydraulic fluid to enter advance chamber 174, the relative relationship between camshaft 166 and crankshaft 108 may be advanced. As a result, intake valve 116 and exhaust valve 118 may open and close at a time earlier than normal relative to crankshaft 108.

While this example shows a system in which the intake and exhaust valve timing are controlled concurrently, variable intake cam timing, variable exhaust cam timing, dual independent variable cam timing, dual equal variable cam timing, or other variable cam timing may be used. Further, variable valve lift may also be used. Further, camshaft profile switching may be used to provide different cam profiles under different operating conditions. Further still, the valve train may be roller finger follower, direct acting mechanical bucket, electrohydraulic, or other alternatives to rocker arms.

Continuing with VCT system 160, teeth 171, rotating synchronously with camshaft 166, allow for measurement of relative cam position via cam timing sensor 176 providing signal VCT to controller 12. Teeth 1, 2, 3, and 4 may be used for measurement of cam timing and are equally spaced (for example, in a V-8 dual bank engine, spaced 90 degrees apart from one another) while tooth 6 may be used for cylinder identification. In addition, controller 12 sends control signals (LACT, RACT) to conventional solenoid valves (not shown) to control the flow of high pressure hydraulic fluid either into retard chamber 172, advance chamber 174, or neither. In one embodiment, the high pressure hydraulic fluid may be the oil pumped by the oil pump 182.

Relative cam timing can be measured in a variety of ways. In general terms, the time, or rotation angle, between the rising edge of the PIP signal and receiving a signal from one of the plurality of teeth 171 on housing 169 gives a measure of the relative cam timing. For the particular example of a V-8 engine, with two cylinder banks and a five-toothed wheel, a measure of cam timing for a particular bank is received four times per revolution, with the extra signal used for cylinder identification.

As described above, FIG. 1 shows one cylinder of a multi-cylinder engine, and each cylinder may similarly include its own set of intake/exhaust valves, fuel injector, ignition system, etc.

Controller 12 is shown in FIG. 1 as a microcomputer, including microprocessor unit 14, input/output ports 16, an electronic storage medium with non-transitory memory for executable programs and calibration values, shown as read-only memory chip 18 in this particular example, random access memory 20, keep alive memory 22, and a data bus. Controller 12 is shown receiving various signals and information from sensors coupled to engine 10, in addition to those signals previously discussed, including measurement of inducted mass air flow (MAF) from mass air flow sensor 128; manifold absolute pressure (MAP) from MAP sensor 130; engine coolant temperature (ECT) from temperature sensor 134 coupled to cooling sleeve 136; a profile ignition pickup signal (PIP) from Hall effect sensor 138 (or other type) coupled to crankshaft 108; throttle position (TP) from a throttle position sensor 140. Further, controller 12 receives input regarding a temperature of engine oil (EOT) from an engine oil temperature sensor 142. Engine oil temperature sensor 142 may be mounted in engine block region 100. In some examples, engine oil temperature sensor may be mounted in the engine block or in the cylinder head. Such information may be used to determine a mode of operation for the oil delivery system, and output of the oil delivery system 180 will be described in more detail below with respect to FIGS. 3, 4 and 5.

The controller 12 may receive signals from the various sensors of FIG. 1 and employ the various actuators of FIG. 1 to adjust engine operation based on the received signals and instructions stored on a memory of the controller. For example, controller 12 may include memory with computer readable instructions for actuating the variable displacement oil pump to output oil at an upper threshold level in response to a command to advance the intake cam while engine speed is below a threshold speed and engine oil temperature is above a threshold temperature or a command to return the intake cam to a base (e.g., home) position that is a threshold amount of crank angle degrees away from a current position. Controller 12 may otherwise actuate the oil pump to output oil at a second level that is lower than the upper threshold level, the second level based on engine speed, engine load, and engine oil temperature.

In some examples, adjusting oil pump 182 may include adjusting an actuator of oil pump 182 to adjust the oil output of the oil pump. Adjusting an actuator of the oil pump may include the controller sending a signal, based on a first relationship between oil pressure, engine load, and engine speed and a second relationship between oil pressure, engine oil temperature, and engine speed, to the actuator of the oil pump in order to adjust the oil output of the oil pump.

Engine speed signal RPM is generated by controller 12 from signal PIP in a conventional manner and manifold absolute pressure signal MAP from manifold absolute pressure sensor 130 provides an indication of vacuum, or pressure, in the intake passage 112. During stoichiometric operation, one or more of the MAF and MAP sensors can be used to provide an indication of engine load. Use of the MAF and/or MAP sensors, along with engine speed, may provide an estimate of charge (including air) inducted into an engine cylinder, which may be used to determine engine load. In some examples, engine load may be a calculated load value (CLV) or an absolute load value (ALV). It will be appreciated that engine load may be characterized using a plurality of methods. One example method of quantifying engine load is the ratio of current airflow through an engine cylinder divided by the maximum possible airflow through that cylinder. This ratio may be 1 at wide-open-throttle. Boosted engines may be able to achieve an engine load greater than 1 as compressed air (e.g., air at a pressure greater than barometric pressure) is forced into the engine cylinders. Likewise, it will be appreciated that calibration of oil pump 182 may likewise use data regarding indications of engine load other than engine load based on MAF or MAP sensor indications. In one example, oil flow pressure from oil pump 182 may be adjusted responsive to an indication of engine torque, or to an indication of engine vacuum. Further, it will be appreciated that calibration of the oil pump 182 may use data regarding indications of engine temperature other than engine oil temperature. In one example, oil flow from oil pump 182 may be adjusted responsive to engine coolant temperature or another suitable temperature indication.

In one example, Hall effect sensor 138, which is also used as an engine speed sensor, produces a predetermined number of equally spaced pulses per revolution of the crankshaft. As will be described below, engine speed, engine load, and engine oil temperature measurements may be used to determine oil pump output.

As another example, adjusting the oil flow delivered to the VCT system 160 may include the controller 12 receiving an indication of VCT phaser position from cam timing sensor 176, an engine speed from Hall effect sensor 138, and an indication of engine oil temperature from engine oil temperature sensor 142. In one non-limiting example, responsive to those indications, including a request to move the VCT phase to a home position from a position of more than a threshold distance from the home position, the controller 12 may command an actuator of the oil pump 182 to increase output of the oil pump 182 to an upper threshold oil pressure, in order to provide an increased amount of oil flow to the VCT system 160. In one example, the upper threshold oil pressure may be the maximum oil pressure the oil pump 182 can generate.

In this way, shifting velocity of the VCT system (e.g., VCT phaser) may be increased by supplying the VCT system with increased oil pressure during certain operating conditions of the VCT system. One example condition of the VCT system may include a request to advance an intake cam of the VCT system while engine oil temperature is above a threshold oil temperature and engine speed is below a threshold engine speed. Another example condition of the VCT system may include a request to return the VCT system to a base position from a position that is a threshold amount of crank angle degrees away from the base position. In one example, the request to return the VCT system to the base position may be responsive to an engine stall condition.

The VCT system 160 of FIG. 1 is shown with one camshaft 166 that may adjust both intake valve 116 and exhaust valve 118. Alternately, FIG. 2 shows another schematic depiction of a variable cam timing (VCT) system 250 for an engine 200. It will be appreciated that engine 200 may be the same as engine 10 (shown in FIG. 1), but engine 200 may include a VCT system that is configured to adjust the timing of the intake valves using a first camshaft, while adjusting the timing of the exhaust valves using a second camshaft. It will be appreciated that in other examples, the VCT system may be configured to adjust the timing of the intake cams or the timing of the exhaust cams. Engine components of engine 200 not shown in FIG. 2 may be identical to those engine components of engine 10 shown in FIG. 1.

As shown, engine 200 includes the first cylinder 202 and a second cylinder 222. However, it will be appreciated that the number of cylinders in the engine may be varied in other examples. For instance, the engine 200 may include four cylinders, in one example.

The cylinders are arranged in an inline configuration. That is to say that a flat plane extends through the centerline of each cylinder. However, other cylinder positions have been contemplated. The intake valve 204 and the exhaust valve 206 of the first cylinder 202 are shown. It will be appreciated that the valve may be positioned, respectively, in an intake port and an exhaust port. Likewise, an intake valve 224 and an exhaust valve 226 are coupled to the second cylinder 222. The intake valve 224 and the exhaust valve 226 are configured to open during combustion operation. Specifically, the intake valve 224 may enable fluidic communication between the second cylinder 222 and the intake manifold 110, shown in FIG. 1, in an open configuration and inhibit fluidic communication between the second cylinder 222 and the intake manifold 110, shown in FIG. 1, in a closed configuration. Additionally, the exhaust valve 226 may enable fluidic communication between the second cylinder 222 and the exhaust passage 114, shown in FIG. 1, in an open configuration and inhibit fluidic communication between the second cylinder 222 and the exhaust passage 114, shown in FIG. 1, in a closed configuration.

The VCT system 250 may include an intake camshaft 208 and/or an exhaust camshaft 228. The intake camshaft 208 may include intake cam 210 and intake cam 230 coupled thereto. The intake cams 210 and 230 are configured to cyclically actuate the intake valves during combustion operation. Likewise, the exhaust camshaft 228 may include exhaust cam 212 and exhaust cam 232 coupled thereto. The exhaust cams 212 and 232 are configured to cyclically actuate the exhaust valves during combustion operation. It will be appreciated that the circumferential position of the intake and/or exhaust cams may vary to enable actuation of the intake and exhaust valves at different time intervals.

The VCT system 250 further includes a first phaser 214 (e.g., intake phaser) and a second phaser 234 (e.g., exhaust phaser). As shown, the first phaser 214 is coupled to the intake camshaft 208. Additionally, the second phaser 234 is coupled to the exhaust camshaft 228. The first and second phasers may be configured to adjust the phase between the crankshaft 108, shown in FIG. 1, and the respective camshaft. The first phaser 214 may be identical to the second phaser 234. However, in other examples the phasers (214 and 234) may have dissimilar configurations. The VCT system 250 may further include mechanical linkage 260 coupling the crankshaft 108, shown in FIG. 1, to the camshafts (208 and 228).

The first, intake phaser 214 may include a locking mechanism 218 generically depicted via a box. Likewise, the second, exhaust phaser 234 may also include a locking mechanism 238. The locking mechanisms (218 and 238) may be identical, in one example, or may have dissimilar configurations. In some examples, locking mechanism may include an actuatable pin that engages with a locking recess in order to lock a phaser in a home position.

The controller 12 (shown in FIG. 1) may be configured to control the VCT system 250 to advance or retard intake and/or exhaust valve timing. Specifically, the controller 12 may be electronically (e.g., wired and/or wirelessly) coupled to control valves 220 and 240 (e.g., solenoid valves) in the VCT system 250. The control valves 220 and 240 may be coupled to or integrated into their respective phaser. The control valves 220 and 240 may be configured to adjust the phase between the crankshaft 108, shown in FIG. 1, and a corresponding camshaft. Specifically, the control valves 220 and 240 may be oil control valves configured to hydraulically adjust the phase angle between the crankshaft 108, shown in FIG. 1 and camshaft 208 or camshaft 228, respectively. Thus, the control valves 220 and 240 may receive oil from conduits in the engine. However, other suitable types of control valves have been contemplated.

Camshaft bearings 270 are coupled to the intake camshaft 208 and the exhaust camshaft 228. The camshaft bearings 270 are configured to support as well as enable rotation of the camshaft to which they are coupled. The spark plug 221 is also shown coupled to the first cylinder 202. A second spark plug 241 or other suitable ignition device may be coupled to the second cylinder 222.

As previously mentioned, the output of an oil pump, in one example, a variable displacement oil pump, may be actively controlled by a vehicle controller to meet the engine cooling, lubrication, and actuation demands of an engine for a given operating condition. Specifically, a controller, such as controller 12 of FIG. 1, may reference calibration data stored in its memory to adjust the output of an oil pump, such as oil pump 182 coupled to the engine. In one non-limiting example, adjustment of the oil pump output may be responsive to engine parameters such as engine oil temperature, engine load, and engine speed.

Turning now to FIG. 3, an example calibration graph 300 of oil pressure and engine load for varying engine speeds is shown for determining a target oil pressure output from an engine oil pump, such as oil pump 182 of FIG. 1. It will be appreciated that in some examples, the engine oil pump may be a variable displacement or variable flow type pump. Calibration graph 300 shows the relationship between a target oil pressure from the variable displacement oil pump relative to engine load for various engine speeds. In one non-limiting example, engine load may be determined using an output of a MAF and/or a MAP sensor (e.g., MAF sensor 128 and MAP sensor 130 of FIG. 1). In one non-limiting example, engine speed may be determined using an output of a Hall effect sensor (e.g., Hall effect sensor 138 of FIG. 1). As shown by calibration graph 300, plot 302 shows that at reduced engine speeds (e.g., 1000 rpm, in one example), the target oil pressure remains reduced and steady, with engine load having little effect on target oil pressure. Plot 304 shows that at elevated engine speeds (e.g., 4000 rpm, in one example), the target oil pressure remains elevated and steady, again with engine load having little effect on target oil pressure. Plot 306 shows that at intermediate engine speeds (e.g., 2500 rpm, in one example), the target oil pressure increases with increasing engine load. It will be appreciated that the correlation between engine load and target oil pressure shown in FIG. 3 is shown as an illustrative example, and any suitable correlation may be used. Additionally, while calibration graph 300 includes three engine speed curves, in alternate embodiments, the graph may include additional or different engine speed curves. In some examples, tables or mapped data may be used to determine a target oil pressure. In other examples, instead of calibrating a target oil pressure using engine load, operating parameters such as engine torque and/or vacuum may be used.

Turning now to FIG. 4, another example a calibration graph 400 of oil pressure and engine oil temperature for varying engine speeds 400 is shown for determining a target oil pressure output from a variable displacement oil pump, such as the oil pump 182 of FIG. 1. Again, it will be appreciated that in some examples, the engine oil pump may be a variable displacement or variable flow type pump. Calibration graph 400 shows a target oil pressure relative to engine temperature for various engine speeds (as shown by curves 402, 404, 406, and 408 in FIG. 4). In one non-limiting example, engine temperature may be an engine oil temperature as measured by an engine oil temperature sensor (e.g., engine oil temperature sensor 142 of FIG. 1). In one non-limiting example, engine speed may be determined using an output of a Hall effect sensor (e.g., Hall effect sensor 138 of FIG. 1). At relatively low engine temperatures, the target oil pressure may be at an upper threshold, regardless of the engine speed. As the engine oil temperature increases, as shown in FIG. 4, the target oil pressure may decrease. In one example, as engine speed increases with engine temperature, the target oil pressure also increases. An example upper threshold target oil pressure is shown by a dashed plot 410 in FIG. 4. In some examples, the upper threshold target oil pressure may be the maximum oil pressure producible by the oil pump. In other examples, the upper threshold target oil pressure may be the oil pressure and/or oil flow rate that enables more rapid shifting of the VCT system for a given operating condition. It will be appreciated that the controller may reference more than one upper threshold target oil pressure. For example, depending on engine operating conditions (engine oil temperature and engine load) a unique upper threshold target oil pressure may be indicated for each of those operating conditions that enables the most rapid shifting of the VCT system. The shaded region 412 that contains data point 414 may be considered a warm idle condition. Specifically, the engine speed may be below an idle threshold 402 (e.g., 1000 rpm in one non-limiting example) and the engine temperature (e.g. engine oil temperature) may be above what may be considered a "warm" threshold, shown by dashed line 416. Further discussion regarding data points 414 and 418 will be discussed below with reference to FIG. 5.

It will be appreciated that target oil pressure may be characterized using a plurality of suitable methods. In some examples, one or more tables or graphs may be stored in a memory of a controller (e.g., controller 12 shown in FIG. 1) and used by the controller to determine the target oil pressure for the current engine speed, engine load, and engine oil temperature. In other examples, an algorithm, formula, or computational model of one or more relationships between target oil pressure and engine speed, engine load, and engine oil temperature, similar to the graphs shown in FIGS. 3 and 4, may be stored in the controller memory and used to determine a target oil pressure. Further, several calibration correlations may be referenced (e.g., looked up within the memory of the controller), and either the highest oil pressure referenced, or the lowest oil pressure referenced, may be indicated as the target oil pressure for the given operating conditions. For example, if a target oil pressure indicated by FIG. 3 for a given engine speed and engine load is greater than the target oil pressure indicated by FIG. 4 for the same conditions (e.g., same engine speed and corresponding engine load), the vehicle controller may actuate the oil pump (e.g., oil pump 182 of FIG. 1) to output the higher target oil pressure (e.g., the target oil pressure of FIG. 3).

Figure 5:
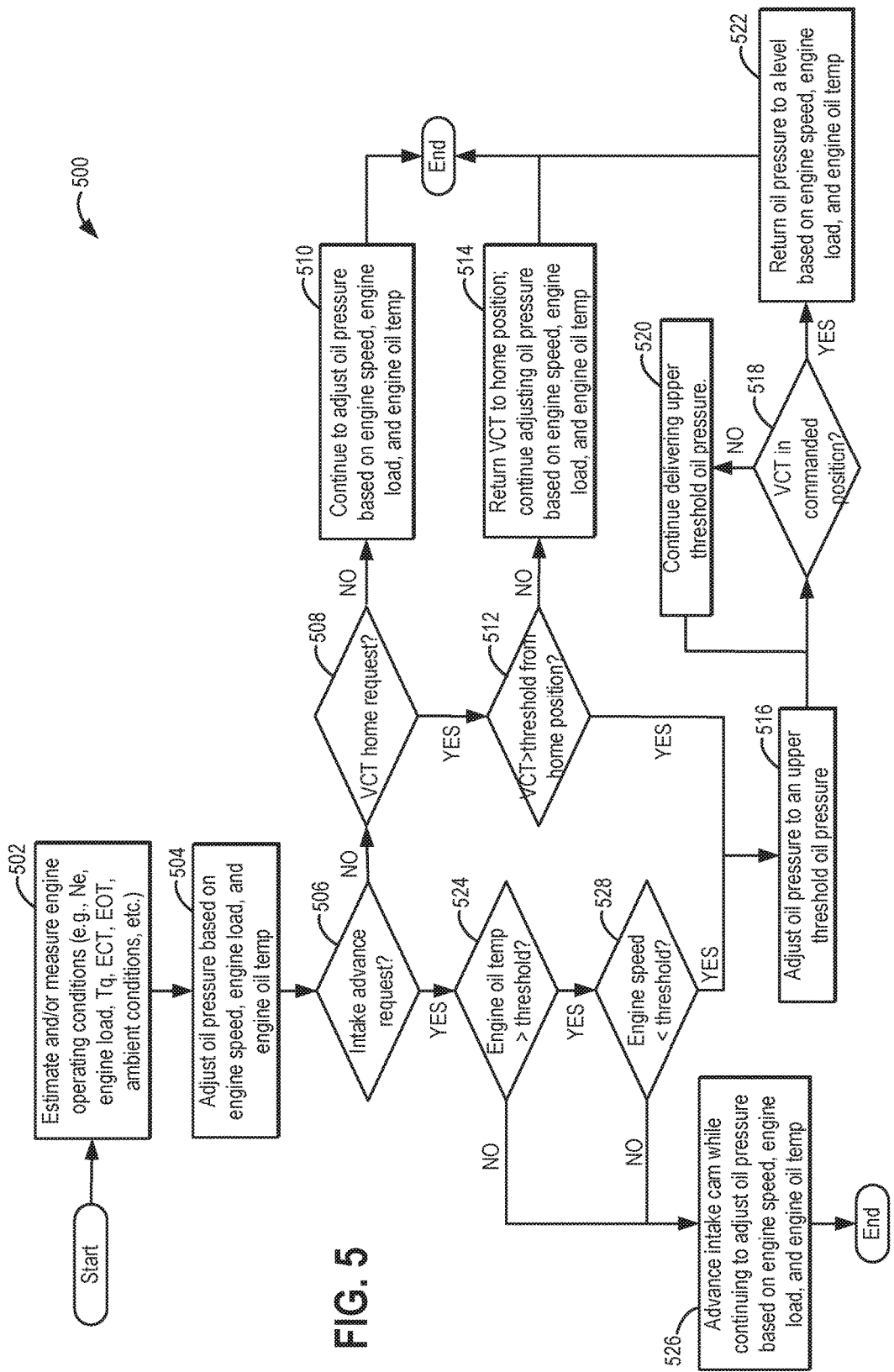
FIG. 5 shows a flowchart illustrating an example routine for adjusting oil pressure supplied to an engine and variable cam timing (VCT) system based on engine operating conditions and conditions of the VCT system.
Figure 6:
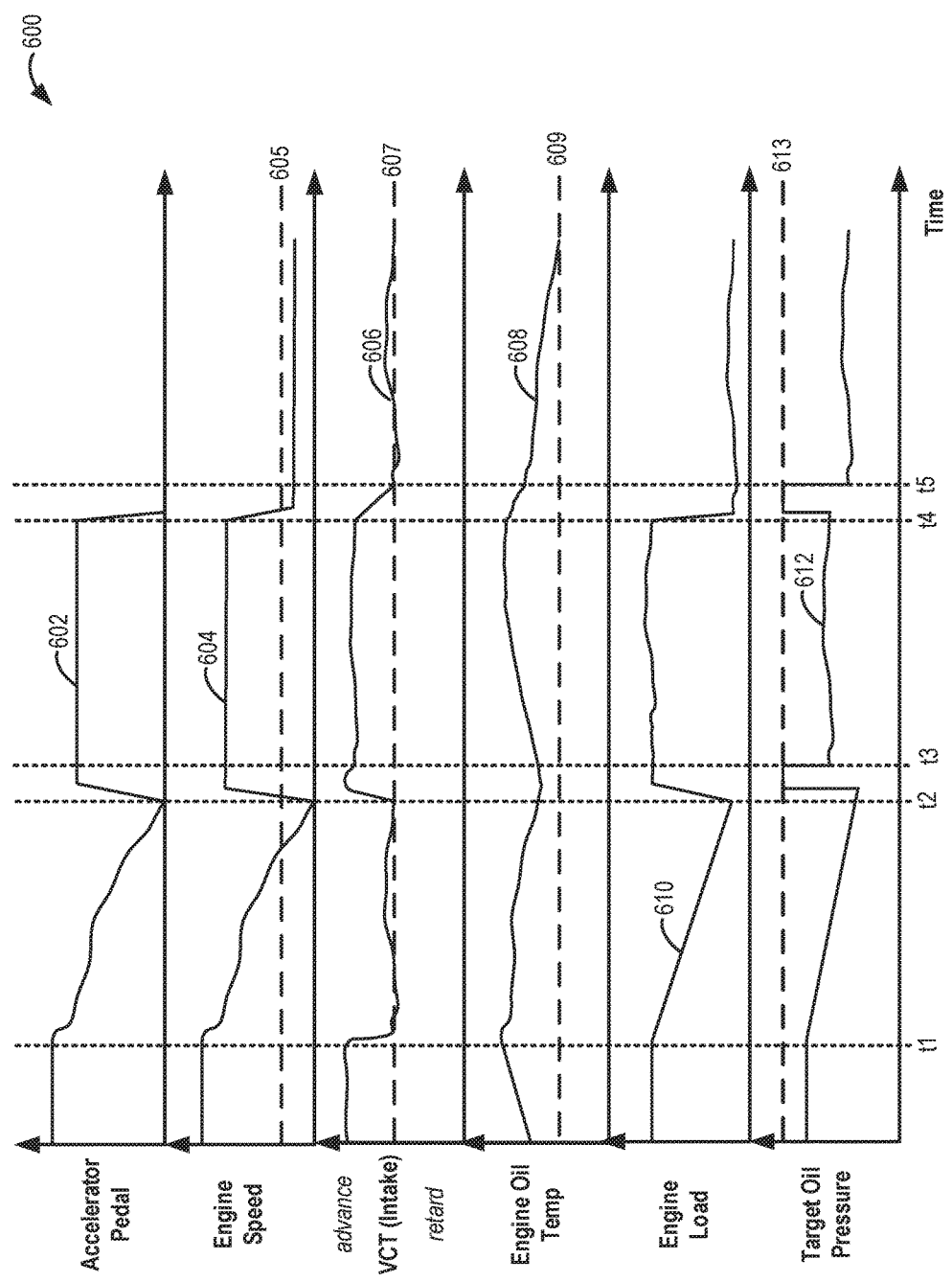
FIG. 6 shows an example operation of an engine and oil pump responsive to conditions of the VCT system.

Turning now to FIG. 5, a flowchart illustrating an example routine 500 for adjusting oil pressure supplied to an engine and variable cam timing (VCT) system based on engine operating conditions and conditions of the VCT system is shown. Instructions for carrying out method 500 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. In one example, the controller may control a target engine oil pressure based on sensor inputs indicative of engine oil temperature, engine speed, and engine load. Specifically, the controller may receive an indication of engine oil temperature from a temperature sensor (e.g., temperature sensor 142 of FIG. 1), an indication of engine speed from a sensor (e.g., Hall effect sensor 138 of FIG. 1), and an indication of engine load from a mass airflow sensor (e.g., MAF sensor 128 of FIG. 1). In one non-limiting example, responsive to indications of an increasing engine oil temperature for a constant engine speed and engine load, the controller may send a signal to an actuator (e.g., regulator) of an oil pump to selectively decrease the target engine oil pressure in order to provide a suitable amount of oil flow and pressure, thereby providing the desired amount of cooling, lubrication, and/or actuation for oil pressure actuated devices. One example of an oil pressure actuated device is a hydraulic valve lifter coupled to an engine cylinder, where oil flow and/or pressure is used to adjust valve clearance. In another non-limiting example, responsive to a command to adjust a timing (e.g., intake cam timing) of the VCT system (e.g., VCT system 160 shown in FIG. 1 and/or VCT system 250 shown in FIG. 2) during select engine operating conditions, the controller may send a signal to the actuator of the oil pump to increase the target engine oil pressure to an upper threshold. As explained further below, this upper threshold may be greater than a level that would be commanded based on engine oil temperature, engine speed, and engine load alone (e.g., using graphs, tables, or relationships, such as those shown in FIGS. 3-4).

At 502, the routine includes estimating and/or measuring engine operating conditions for an engine, such as the engine 10 shown in FIG. 1. Engine operating conditions may include, but are not limited to, engine speed (Ne), engine load, desired engine torque (Tq), manifold absolute pressure (MAP), manifold airflow (MAF), engine coolant temperature (ECT), engine oil temperature (EOT), accelerator pedal position, a current timing and position of the VCT system, and ambient conditions such as humidity and barometric pressure. At 504, the routine includes adjusting an engine oil pressure based on engine speed, engine load, and engine oil temperature. Adjusting the oil pressure at 504 may include adjusting the oil pressure output by an oil pump, where the oil pump supplied oil to the engine and the VCT system (as described above with reference to FIGS. 1-2). It will be appreciated that adjusting the oil pressure of the oil pump may include adjusting the oil flow through the oil pump. For simplicity, adjusting oil pump output may be synonymous with adjusting one or more of oil pump flow, oil pump pressure, and oil pump power. Adjusting the output of the oil pump may include increasing the electrical current to the oil pump. In one example, adjusting the oil pressure includes actuating an oil pump (e.g., oil pump 182 of FIG. 1) coupled to the engine to control one or more of an oil pressure and an oil flow from the oil pump. Actuation may be via an oil pump regulator, in one non-limiting example. In some examples, the oil pump may be actuated to increase an oil pressure or an oil flow so that engine components downstream of the oil pump (including the VCT system) may receive an increased oil flow and/or oil pressure to facilitate increased cooling, increased lubrication, and/or increased actuation of an engine component. In one embodiment, the depicted oil pump may be a variable displacement oil pump (VDOP), but it will be appreciated that other types of pumps may be used in conjunction with a method for actively adjusting the oil output from the oil pump. Other example methods for actively adjusting oil output from an oil pump may include a valve or regulator coupled to the oil pump.

Adjusting the oil pressure based on engine speed, engine load, and engine oil temperature may be accomplished by using one or more of a plurality of calibration tables and/or graphs, using mapped data, using a formula or algorithm, and/or using a computational model of engine operating conditions, all of which may be stored in a memory of the controller and then looked up by the controller during engine operation. Two non-limiting examples of calibration graphs that may be used for determining a target oil pressure are shown in FIGS. 3 and 4. Therein, a target oil pressure may be determined when the engine speed, engine load, and engine oil temperature are known. For example, the controller may look up a first target oil pressure using a first graph (e.g., graph 300 shown in FIG. 3) or relationship between engine oil pressure and engine load and engine speed and then look up a second target oil pressure using a second graph (e.g., graph 400 shown in FIG. 4) or relationship between engine oil pressure and engine oil temperature and engine speed. In some examples, the controller (e.g., controller 12 of FIG. 1) may then select the higher of the first and second target oil pressures and then actuate the oil pump to output the higher of the first and second target oil pressures. In this way, oil pressure supplied to the VCT system and the engine is adjusted to a level (e.g., first level) that is based on each of (e.g., all of) engine speed, engine load, and engine oil temperature. For example, the controller may determine the oil pressure to be supplied to the engine and VCT system as a function of each of engine speed, engine load, and engine oil temperature. In some examples, the method at 504 may include adjusting the oil pressure based on engine speed, engine load, and engine oil temperature (as determined based on signals received from engine sensors), according to the stored relationships discussed above, and not based on operation of the VCT system. In other examples, and depending on operating conditions, the lowest of the two reference values may be set as the target oil pressure.

At 506, the routine includes determining whether one or more of an intake advance request for the VCT system (e.g., for the intake cam of the VCT system) and an exhaust advance request for the VCT system (e.g., for the exhaust cam of the VCT system) has been received. In one non-limiting example, a request to advance the timing of the intake valves, via adjusting a position of the intake camshaft, may occur when there is a torque request at reduced engine speeds. As a result of advancing the intake camshaft (e.g., intake camshaft 208 of FIG. 2), intake valves (e.g., intake valve 204 of FIG. 2) may open before top-dead center (TDC) and close earlier than when not advanced, resulting in combustion occurring at a higher compression ratio. This may increase available torque at low engine speeds. An intake advance request may occur responsive to an operator pedal tip-in or increase in driver torque demand. It will be appreciated that by adjusting the intake phaser, a corresponding adjustment in the position and timing of the intake cam may occur. As a result of adjusting the position and timing of the intake cam, a corresponding adjustment in the position and timing of the intake valves may occur. As a result, adjustment of the aforementioned components of the VCT system may be collectively referred to as adjusting the VCT system, or adjusting the position of the VCT system. Likewise, a base or home position of the intake phaser correlates to moving to the intake camshaft to the base or home position, which also correlates to moving the VCT system into the base or home position. For engine embodiments that include respective intake and exhaust VCT systems, the aforementioned relationships also apply to the exhaust phaser, exhaust cam, exhaust valves, and exhaust VCT system.

If an intake advance is not requested, such as when the engine load is relatively low or the driver torque demand is relatively low, the routine moves to 508, where the controller determines whether a home request for the VCT (e.g., VCT intake phaser 214 or exhaust phaser 234 of FIG. 2) has been received. It will be appreciated that a home request may include a request to move the VCT system (e.g., one or more of an intake phaser and exhaust phaser) to a base position (also referred to herein as a home position). In one non-limiting example, a home request for the VCT system may occur when the VCT system is anywhere from 3 to 60 crank angle degrees away from the home position, but other crank angle degrees have been contemplated. It will be appreciated that a request to return the VCT system to the base position may be responsive to one or more of an engine stall condition, an engine shut off request, or a request to execute a camshaft position learning routine. A camshaft learning routine may include intentionally locking one or more camshafts at a home position to determine a suitable zero degree position. In this way, a zero degree camshaft position can be learned for given engine operating conditions and referenced by the controller for future shifts of the VCT system.

In some examples, moving the VCT system to a base position may include one or more of moving an intake camshaft to a full retard position, and moving an exhaust camshaft to a full advance position. In other examples, moving the VCT to a base position may include moving the intake camshaft to a full advance position. Further, some VCT system use what is known as "mid lock" or "middle locking" system where the base position of one or more of an intake camshaft and an exhaust camshaft is neither a full advance position nor a full retard position. In some examples, a home request for the VCT system may occur when the engine load is reduced or when the controller receives a drop in operator torque demand. Bringing the engine to an idle condition from an engine speed above idle, or an engine shutdown condition (e.g., turning the engine off), may also initiate a home request for the VCT system.

If a home request for the intake phaser has not been received, then the routine continues to 510, where the routine includes continuing to adjust the oil pressure based on engine speed, engine load, and engine oil temperature, as explained above with reference to 504, before the routine ends.

If at 508, the controller determines a home request for the VCT system, or VCT intake phaser, has been received, then the routine proceeds to 512, where the routine includes determining whether the current position of the intake phaser is more than a threshold number of crank angle degrees away from the home position. In one example, the threshold number of crank angle degrees may be 25 crank angle degrees. In other examples, the threshold number of crank angle degrees may be between 20 and 30 crank angle degrees. In some examples, an engine stall condition may generate a request to return the VCT system (e.g., intake phaser) to the base position from a position that is more than a threshold number of crank angle degrees away from the home position. If the intake phaser is not more than a threshold number of crank angle degrees from the home position, then routine continues to 514, where the routine includes the controller commanding the intake phaser of the intake cam to return the intake cam to the home position while continuing to adjust oil pressure based on engine speed, engine load, and engine oil temperature, according to the method described above at 504. In one example, commanding the intake phaser to return to the home position may include the controller sending a signal to actuate an electromechanical spool valve coupled to the VCT system to direct oil flow to a one side of the intake phaser in order to actuate the vane, thereby causing the intake phaser to move toward the home position.

If the intake phaser is more than a threshold number of crank angle degrees from the home position, then the routine continues to 516, where the routine includes adjusting the oil pressure to an upper threshold oil pressure. As one example, the method at 516 may include the controller commanding the oil pump to adjust the oil pressure to the upper threshold oil pressure. In one example, the upper threshold oil pressure may be the maximum oil pressure the oil pump is capable of generating. In other examples, the upper threshold oil pressure may be determined based on the oil pressure that enables a more (e.g., the most) rapid shifting speed of the VCT phaser. For example, the upper threshold oil pressure may be the pressure required for shifting the intake camshaft from the current position to the home position, which are separated by a threshold amount of crank angle degrees. In this way, the VCT system is provided with suitable oil pressure to shift rapidly from the current position to the home position, which may lead to increased responsiveness and performance. It will be appreciated that additionally or optionally, the oil pump may monitor output with respect to oil flowrates rather than oil pressure. In this way, the controller commands the oil pump to increase the oil pressure to an upper threshold oil pressure, even when the controller would adjust the oil pressure to a different level based on the engine oil temperature, engine load, and engine speed, as discussed above at 504. In this way, the upper threshold oil pressure may be greater than the oil pressure level that would be determined based on the current engine speed, engine load, and engine oil temperature, according to the relationships discussed above at 504.

The routine then continues to 518, where the routine includes determining whether the VCT system (e.g., the VCT phaser of the intake cam) is in the commanded position. In one example, with respect to a VCT home request, the commanded position may include the VCT phaser coming fully into the home (e.g., base) position and actuation of a locking mechanism (e.g., locking mechanism 218 of FIG. 2) to lock the VCT phaser into the home position. In other examples, with respect to a VCT home request, the VCT phaser may be fully in the home position but not locked via a locking mechanism. If the VCT phaser is not in the commanded position, then the routine continues to 520, where the routine includes continuing delivering the upper threshold oil pressure for a duration. In one example, the duration is the time elapsed between a first event, the first event including a command to shift the VCT system and a second event, the second event including confirming that the VCT system (e.g., VCT phaser) is located in the commanded position. In other examples, the duration is the duration of a shift from a current position of the VCT system, prior to the condition of the VCT system, to a commanded position of the VCT system. In this way, the oil pump maintains the oil pressure output to a second level (e.g., upper threshold oil pressure) that is higher than the first level (e.g., pressure as indicated by engine speed, engine load, and engine oil temperature) for the duration. As a result, the routine enables sufficient oil pressure to the VCT system for the entire duration of the VCT shift. The VCT phaser position may be determined via output from a cam timing sensor (e.g., cam timing sensor 176 of FIG. 1).

If the VCT phaser is in the commanded position (e.g., home position), the routine continues to 522, where the routine includes returning oil pressure to a pressure level that is based on engine speed, engine load, and engine oil temperature, according to the method described at 504, before the routine ends. In one example, returning oil pressure to a pressure level based on engine speed, engine load, and engine oil temperature may include reducing the oil pressure from the upper threshold pressure and returning to controlling the oil pump output based on calibration data (e.g., relationships between engine oil pressure and each of engine speed, engine load, and engine oil temperature, as discussed above with reference to 504 and FIGS. 3-4). As previously stated, in some examples, one or more calibration tables or graphs may be used to look up and determine the oil pressure output of the oil pump based on current engine speed, engine load, and engine oil temperature values, as determined from engine sensors. In other examples, an algorithm, formula, or computational model of engine operation may be used to determine a target oil pressure based on current engine speed, engine load, and engine oil temperature values. Further, several calibration correlations may be referenced (e.g., looked up in the memory of the controller), and either the highest oil pressure referenced, or the lowest oil pressure referenced, may be indicated as the target oil pressure for the given operating conditions.

If an intake advance request was received at 506, the routine continues to 524, where the routine includes determining whether the engine oil temperature is greater than a threshold engine oil temperature. In one example, the threshold engine oil temperature may be a temperature considered a warm engine condition, such as the warm engine condition 408 shown in FIG. 4, when engine oil viscosity is suitable for the desired control methods. If the engine oil temperature is not greater than the threshold oil temperature, then the routine proceeds to 526, where the routine includes advancing the intake camshaft while continuing to adjust oil pressure based on engine speed, engine load, and engine oil temperature, as described above at 504. For example, the method at 526 may include advancing the intake cam while delivering oil to the VCT system at a level that below the upper threshold oil pressure and based on engine speed, engine load, and engine oil temperature.

If the engine oil temperature is greater than a threshold engine oil temperature at 524, the routine continues to 528, where the routine includes determining whether engine speed is less than an engine speed threshold. In one non-limiting example, the engine speed threshold may be an engine idle condition. An engine idle condition may include an engine operating condition that does not include an operator torque demand, as may be indicated by actuation of an accelerator pedal (e.g., accelerator pedal 34 of FIG. 1). In some examples, an engine idle condition may include engine speeds of 500-1250 rpm, although it has been contemplated that the idle condition may include a different engine speed range. Engine speed may be determined via an engine speed sensor coupled to the engine crankshaft (e.g., crankshaft 108 of FIG. 1). In one example, the engine speed sensor may be a Hall effect sensor.

If the engine speed is not less than the threshold then the routine proceeds to 526, where the routine includes advancing the intake camshaft while continuing to adjust oil pressure based on engine speed, engine load, and engine oil temperature. If the engine speed is less than the threshold then the routine proceeds to 516, where the routine includes adjusting the oil pressure to the upper threshold oil pressure, as described above. As one example, the routine at 516 may include the controller commanding the oil pump to adjust the oil pressure to the upper threshold oil pressure. In one example, the upper threshold oil pressure may be the maximum oil pressure producible by the oil pump. In other examples, the upper threshold oil pressure may be determined based on the oil pressure that enables the most rapid shifting speed of the VCT phaser. One example of this control method is shown with reference to FIG. 4. Data point 404 is one example of an engine operating condition that occurs when engine oil temperature is above a warm engine oil temperature threshold, and the engine speed is below an idle threshold (e.g., the "warm idle condition" shown by the shaded region in FIG. 4). If an intake advance request is received when engine conditions are in the shaded region, as shown by data point 404, the method includes increasing the target oil pressure to the upper threshold oil pressure as shown by data point 406 of FIG. 4 (instead of the oil pressure corresponding to data point 404). In this way, responsive to an intake advance request during a warm idle condition when engine oil temperature is great than the threshold oil temperature and engine speed is less than the threshold speed, the controller may increase the oil pressure from the oil pump to an upper threshold, even if the recommended oil pressure for the given operating conditions (e.g., engine load, engine speed, engine oil temperature) indicate that a lower oil pressure is suitable. For example, the target oil pressure as determined based on the relationships between oil pressure and oil temperature, engine load, and engine speed (e.g., as shown in FIGS. 3-4) may be less than the upper threshold oil pressure. As a result of increasing the oil pressure to an upper threshold during an intake advance request, the VCT system may respond to the intake advance request more rapidly, increasing responsiveness of the VCT system, which may reduce NVH issues and increase and performance. It will be appreciated that additionally or optionally, the oil pump may monitor output with respect to oil flowrates rather than oil pressure.

As explained above, at 518, the routine includes determining whether the VCT (e.g., VCT system, VCT phaser) is in the commanded position. In one example, with respect to an intake advance request, the VCT being in a commanded position may include the VCT phaser being shifted to a more advanced position than where it was before the intake advance request. The VCT phaser position may be determined via a cam timing sensor (e.g., cam timing sensor 176 of FIG. 1).

If the VCT phaser is not in the commanded advanced position, then the routine continues to 520, where the routine includes continuing delivering upper threshold oil pressure until the VCT phaser is in the commanded advanced position. The VCT phaser position may be determined via a cam timing sensor (e.g., cam timing sensor 176 of FIG. 1).

If the VCT phaser is in the commanded advanced position, the routine continues to 522, where the routine includes returning oil pressure to a pressure level based on engine speed, engine load, and engine oil temperature before the routine ends. In one example, returning oil pressure to a pressure level based on engine speed, engine load, and engine oil temperature may include reducing the oil pressure from the upper threshold pressure to a lower level dictated by the relationships between engine oil pressure and oil temperature, engine speed, and engine load (e.g., based on calibration data shown in FIGS. 3-4). As previously stated, in some examples, one or more calibration tables or graphs may be used. In other examples, an algorithm, formula, or computational model of engine operation may be used to determine a target oil pressure. Further, several calibration correlations may be referenced, and either the highest oil pressure referenced, or the lowest oil pressure referenced, may be indicated as the target oil pressure for the given operating conditions.

Turning now to FIG. 6, an example operation of an engine (such as the engine system shown in FIG. 1 or 2) and oil pump responsive to conditions of the VCT system is shown at example map 600. The horizontal (x-axis) denotes time and the vertical markers t1-t5 identify significant times for engine and oil pump operation. In reference to FIG. 6, plot 602 shows variation in an accelerator pedal position over time. Plot 604 shows variation in engine speed (Ne) over time. Plot 606 shows a timing of an intake cam of a VCT system coupled to the engine. Plot 608 shows changes in engine oil temperature. Plot 610 shows changes in engine load. Plot 612 shows the target oil pressure for the control of the engine oil pump (e.g., the target oil pressure output of the oil pump). As previously mentioned, it will be appreciated that in some examples, the engine oil pump may be a variable displacement or variable flow type pump.

Prior to time t1, the accelerator pedal is at a steady position indicating an operator request for a steady and elevated speed, as shown by plot 602. The engine speed follows a similar trajectory (plot 604) and is above an idle threshold engine speed, as shown by dashed plot 605. The VCT system remains approximately at MBT timing, as shown by plot 606. MBT timing, shown by dashed plot 607, may also be referred to as minimum spark timing, is the timing that enables peak torque or maximum brake torque. Different MBT timings may exist for different operating conditions, where engine operation at MBT timing may yield a maximum amount of work for a given air-to-fuel ratio. It will be appreciated that MBT may coincide with the VCT system in a home position (e.g., base position) where the intake cam is neither advanced nor retarded. Engine oil temperature may increase, as shown by plot 608. The engine load may be elevated, as shown by plot 610. As discussed previously, it will be appreciated that engine load may be characterized using a plurality of methods. One example method of quantifying engine load is the ratio of current airflow through an engine cylinder divided by the maximum possible airflow through that cylinder. MAF and or MAP sensor data may be used to determine engine load using this method. Alternately, indications of engine load other than engine load based on MAF or MAP sensor indications may be used. In one example, engine load may be indicated by engine torque or engine vacuum. A target oil pressure is also increased and steady, as shown by plot 612. The target oil pressure may commanded by a vehicle controller according to calibration data. As previously mentioned, calibration data for controlling target oil pressure may be based on engine parameters including engine oil temperature, engine load, and engine speed, as described above with reference to FIGS. 3 and 4. Thus, prior to time t1, the target oil pressure is below an upper threshold oil pressure (as shown by dashed plot 613).

At time t1, a drop in torque demand occurs, as may be indicated by a reduced actuation of the accelerator pedal (plot 602). The engine speed (plot 604) follows a similar trajectory, reducing speed as the accelerator pedal is gradually released. The timing of the VCT system may remain roughly at MBT, as shown by plot 606. Engine oil temperature (plot 608) may decrease slightly with decreasing engine load (plot 610). With decreasing engine oil temperature and engine load, the target oil pressure may also decrease, as shown by plot 612.

At time t2, a tip-in, such as one that may occur when accelerating on an on-ramp to join high speed traffic, is indicated by accelerator pedal position (plot 602). In some examples, this may be considered a wide-open-throttle (WOT) condition. Consequently, the engine speed increases, as shown by plot 604. The controller may request the VCT system advance the intake cam, as shown by plot 606. The engine load increases with a WOT condition, as shown by plot 610 and the engine oil temperature (plot 608) may increase gradually responsive to the increased load on the engine. Prior to the tip-in at time t2, resulting in an intake advance request, engine operating conditions were considered a warm idle condition, as shown by engine oil temperature above a warm threshold temperature (dashed plot 609) and engine speed below an idle threshold (dashed plot 605). As a result of these engine operating conditions, shortly after time t2, the controller may identify these operating condition, and responsive to them, the controller may command the target oil pressure to the upper threshold oil pressure (as shown by dashed plot 613) in order to provide the VCT system with sufficient oil pressure to shift rapidly to a commanded positions without lag or NVH issues. Thus, after time t2, in response to the request to advance the intake cam while the engine speed is below the corresponding engine speed threshold and engine oil temperature above the corresponding oil temperature threshold, the controller stops adjusting the target oil pressure based on engine speed, engine load, and engine oil temperature (e.g., according to stored relationships, as shown in FIGS. 3-4) and instead increases the target oil pressure to the upper threshold oil pressure.

The target oil pressure remains at the upper threshold oil pressure until time t3, when the controller confirms that the VCT system has reached the commanded position. In the depicted example, the controller may confirm that the VCT has reached the commanded advanced position by receiving an indication of VCT phaser position from a cam timing sensor (e.g., cam timing sensor 176 of FIG. 1). At time t3, the controller may command the oil pump to return to controlling the output of the oil pump using calibration data based on engine speed, engine load, and engine temperature, which may include reducing the oil pressure to a level that is below the upper threshold oil pressure.

At time t3, the accelerator pedal again finds a steady position indicating a request for a steady and elevated vehicle speed, as shown by plot 602. The engine speed follows a similar trajectory (plot 604). Conditions remain relatively stable between times t3 and t4, although it will be appreciated that the engine oil temperature may increase steadily with prolonged engine operation at the current operating conditions. Between times t3 and t4, the target oil pressure may be controlled based on each of engine speed, engine load, and engine oil temperature, and so may increase slightly, as shown by plot 612 but remain below the upper threshold oil pressure.

At time t4, there is a sudden drop in operator torque demand. As a result, at t4, the accelerator pedal is released by the operator (plot 602) and the engine speed may decrease rapidly (plot 604). Engine load may decrease (plot 610) as the throttle may close suddenly, responsive to the sudden decrease in torque demand. Engine oil temperature may begin to decrease, as shown by plot 608 as the engine may no longer be operating under an increased engine load. Responsive to operating conditions, shortly after time t4, the controller may receive an indication of a request to return the VCT system to a base (e.g., home) position as a result of the sudden decrease in torque demand. In the depicted example, prior to time t4, the VCT system may have been at a position that was more than a threshold number of crank angle degrees away from the base (e.g., home) position. As a result, the controller may command the oil pump to increase target oil pressure output to the upper threshold oil pressure (e.g., dashed plot 613), as shown by plot 612.

The target oil pressure remains at the upper threshold oil pressure (plot 612) until time t5, when the controller confirms that the VCT system has reached the commanded home (e.g., base) position, as shown by plot 606. In the depicted example, the controller may confirm that the VCT has reached the commanded advanced position by receiving an indication of VCT phaser position from a cam timing sensor (e.g., cam timing sensor 176 of FIG. 1). The accelerator pedal is not actuated again after t4 (plot 602), and the engine load decreases (plot 610). At time t5, the controller may command the oil pump to return to controlling the output of the oil pump using calibration data based on engine speed, engine load, and engine temperature, which may include reducing the oil pressure to a level that is below the upper threshold oil pressure as the engine continues as an idle (plot 604).

In this way, a variable displacement oil pump may be selectively controlled to provide an increased level of oil pressure to the VCT system during certain operating conditions of the VCT system, leading to an efficient oil delivery system that may minimize parasitic losses and increase fuel economy while still meeting the intermittent high demands of the VCT system.

The technical effect of overriding the default control of the existing engine oil pump responsive to an operating condition of the VCT system is that increased oil pressure may be provided for short durations to facilitate rapid shifting of the VCT system without increasing parasitic losses or degrading fuel economy. Further, as a result of expeditiously supplying the VCT system with the requisite oil pressure for rapid shifting, issues with turbo lag and NVH may decrease, while engine responsiveness and performance may increase.

A method for an engine includes adjusting an oil pressure supplied to an engine and a variable cam timing (VCT) system to a first level based on engine speed, engine load, and engine oil temperature; and in response to a condition of the VCT system, increasing the oil pressure to a second level that is higher than the first level for a duration. In a first example of the method, the condition of the VCT system includes a request to advance an intake cam of the VCT system while engine oil temperature is above a threshold oil temperature and engine speed is below a threshold engine speed. A second example of the method optionally includes the first example, and further includes wherein the condition of the VCT system includes a request to return the VCT system to a base position from a position that is a threshold amount of crank angle degrees away from the base position. A third example of the method optionally includes one or more of the first and second examples, and further includes wherein the request to return the VCT system to the base position is responsive to one or more of an engine stall condition, and engine shut off request, or a request to execute a camshaft position learning routine. A fourth example of the method optionally includes one or more of the first through third examples, and further includes wherein adjusting the oil pressure supplied to the engine and the VCT system includes actuating a variable displacement oil pump to output oil to the engine and the VCT system at the first level or second level. A fifth example of the method optionally includes one or more of the first through fourth examples, and further includes, determining the first level based on a first relationship between oil pressure, engine load, and engine speed and a second relationship between oil pressure, engine oil temperature, and engine speed. A sixth example of the method optionally includes one or more of the first through fifth examples, and further includes determining the first level by selecting a largest value determined from each of the first relationship and the second relationship. A seventh example of the method optionally includes one or more of the first through sixth examples, and further includes wherein the duration is a duration of a shift from a current position of the VCT system, prior to the condition of the VCT system, to a commanded position of the VCT system. An eighth example of the method optionally includes one or more of the first through seventh examples, and further includes, returning the oil pressure to the first level after adjusting the VCT system to the commanded position.

Another method for an engine includes, during a first condition, adjusting a supply pressure of an oil pump that supplies oil to an engine and a variable cam timing (VCT) system to a first level that is based on a relationship between engine speed and engine load and engine speed and engine oil temperature; and during a second condition, adjusting the supply pressure to a second level that is based on a commanded position of the VCT system and not the relationship, where the second level is greater than the first level. In a first example of the method, wherein the oil pump is a variable displacement oil pump. A second example of the method optionally includes the first example, and further includes, determining a third level of the supply pressure based on the relationship between engine speed and engine load and determining a fourth level of the supply pressure based on the relationship between engine speed and engine oil temperature and wherein the first level of the supply pressure is chosen from the third level and fourth level as the greatest of the third level and fourth level. A third example of the method optionally includes one or more of the first and second examples, and further includes wherein the commanded position is an advanced position of an intake cam of the VCT system. A fourth example of the method optionally includes one or more of the first through third examples, and further includes wherein adjusting the supply pressure to the second level is further based on the advanced position while engine speed is below a speed threshold, and the engine oil temperature is above a temperature threshold. A fifth example of the method optionally includes one or more of the first through fourth examples, and further includes wherein the commanded position of the VCT system is a base position, and wherein adjusting the supply pressure to the second level is responsive to a current position of the VCT system being a threshold amount of crank angle degrees away from the base position. A sixth example of the method optionally includes one or more of the first through fifth examples, and further includes, returning the supply pressure to the first level after adjusting the VCT system to the commanded position during the second condition.

A system for an engine includes: a variable cam timing (VCT) system including an intake cam; a variable displacement oil pump fluidly coupled to the engine and the VCT system; and a controller including memory with computer readable instructions for: actuating the variable displacement oil pump to output oil at an upper threshold level only in response to a command to advance the intake cam while engine speed is below a threshold speed and engine oil temperature is above a threshold temperature or a command to return the intake cam to a base position that is a threshold amount of crank angle degrees away from a current position; and otherwise, actuating the variable displacement oil pump to output oil at a second level that is lower than the upper threshold level, the second level based on engine speed, engine load, and engine oil temperature. In a first example of the system, the computer readable instructions include when the intake cam reaches a commanded position, actuating the variable displacement oil pump to reduce the oil output to the second level. A second example of the method optionally includes the first example, and further includes wherein the threshold amount of crank angle degrees is in a range of 20-30 crank angle degrees. A third example of the method optionally includes one or more of the first and second examples, and further includes wherein the upper threshold level is a maximum oil pressure output of the variable displacement oil pump.

In another representation, a method comprises during a first condition, actuating a variable displacement oil pump to output oil at a first level that is lower than an upper threshold level, where the first level is based on each of engine speed, engine load, and engine oil temperature; and during a second condition including one of a command to advance the intake cam while engine speed is below a threshold speed and engine oil temperature is above a threshold temperature and a command to return the intake cam to a base position that is a threshold amount of crank angle degrees away from a current position, actuating the variable displacement oil pump to output oil at the upper threshold level and not the first level.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
adjusting an oil pressure supplied to an engine and a variable cam timing (VCT) system to a first level based on engine speed, engine load, and engine oil temperature; and
in response to a request to advance an intake cam of the VCT system, increasing the oil pressure to a second level that is higher than the first level for a duration.

2. The method of claim 1, wherein the request to advance an intake cam of the VCT system further includes advancing the intake cam while the engine oil temperature is above a threshold oil temperature and the engine speed is below a threshold engine speed.

3. The method of claim 1, wherein the increasing of the oil pressure to the second level is further in response to a request to return the VCT system to a base position from a position that is a threshold amount of crank angle degrees away from the base position.

4. The method of claim 3, wherein the request to return the VCT system to the base position is responsive to one or more of an engine stall condition, an engine shut off request, and a request to execute a camshaft position learning routine.

5. The method of claim 1, wherein the adjusting the oil pressure supplied to the engine and the VCT system includes actuating a variable displacement oil pump to output oil to the engine and the VCT system at the first level or the second level.

6. The method of claim 1, further comprising, determining the first level based on a first relationship between the oil pressure, the engine load, and the engine speed and a second relationship between the oil pressure, the engine oil temperature, and the engine speed.

7. The method of claim 6, further comprising determining the first level by selecting a largest value determined from each of the first relationship and the second relationship.

8. The method of claim 1, wherein the duration is a duration of a shift from a current position of the VCT system, prior to the request to advance the intake cam of the VCT system, to a commanded position of the VCT system.

9. The method of claim 8, further comprising, returning the oil pressure to the first level after adjusting the VCT system to the commanded position.

10. A method, comprising:
    during a first condition, adjusting a supply pressure of an oil pump that supplies oil to an engine and a variable cam timing (VCT) system to a first level that is based on a relationship between engine speed and engine load and a relationship between engine speed and engine oil temperature; and
    during a second condition, adjusting the supply pressure to a second level that is based on a commanded position of the VCT system and not the relationships, where the second level is greater than the first level and the commanded position is an advanced position of an intake cam of the VCT system.

11. The method of claim 10, wherein the oil pump is a variable displacement oil pump.

12. The method of claim 10, further comprising, determining a third level of the supply pressure based on the relationship between the engine speed and the engine load and determining a fourth level of the supply pressure based on the relationship between the engine speed and the engine oil temperature and wherein the first level of the supply pressure is chosen from the third level and fourth level as a greatest of the third level and fourth level.

13. The method of claim 10, wherein the adjusting the supply pressure to the second level is further based on the advanced position while the engine speed is below a speed threshold, and the engine oil temperature is above a temperature threshold.

14. The method of claim 10, wherein adjusting the supply pressure to the second level is responsive to a current position of the VCT system being a threshold amount of crank angle degrees away from the commanded position.

15. The method of claim 10, further comprising, returning the supply pressure to the first level after adjusting the VCT system to the commanded position during the second condition.

16. A system for an engine, comprising:
    a variable cam timing (VCT) system including an intake cam;
    a variable displacement oil pump fluidly coupled to the engine and the VCT system; and
    a controller including memory with computer readable instructions for:
        actuating the variable displacement oil pump to output oil at an upper threshold level only in response to
            a) a command to advance the intake cam while engine speed is below a threshold speed and engine oil temperature is above a threshold temperature or
            b) a command to return the intake cam to a base position that is a threshold amount of crank angle degrees away from a current position; and
        otherwise, actuating the variable displacement oil pump to output oil at a second level that is lower than the upper threshold level, the second level based on the engine speed, engine load, and the engine oil temperature.

17. The system of claim 16, wherein the computer readable instructions further include, when the intake cam reaches a commanded position, actuating the variable displacement oil pump to reduce the oil output to the second level.

18. The system of claim 16, wherein when actuating the variable displacement oil pump to output oil at the upper threshold level in response to the command to return the intake cam to the base position, the threshold amount of crank angle degrees is in a range of 20-30 crank angle degrees.

19. The system of claim 16, wherein the upper threshold level is a maximum oil pressure output of the variable displacement oil pump.

* * * * *